3,299,952
USE OF VISCOELASTIC LIQUIDS FOR CEMENT-
ING WELLS IN SUBTERRANEAN FORMATIONS
Joseph G. Savins, Dallas, Tex., assignor to Mobil
Oil Corporation, a corporation of New York
No Drawing. Filed June 18, 1964, Ser. No. 376,212
15 Claims. (Cl. 166—22)

This invention relates to cementing and relates more particularly to cementing of a well in a subterranean formation.

For various purposes, wells are drilled from the surface of the earth to a subterranean formation. Thus, for example, wells are drilled to subterranean formations to produce and recover a fluid such as water, gas, or oil from the formations. In the drilling of such wells by the rotary method, a drilling mud is pumped from the surface of the earth through the drill pipe to the drill bit. The drilling mud then flows upwardly from the drill bit through the well between the drill pipe and the wall of the well to the surface of the earth. The drilling mud performs various functions, the most important of which is carrying the cuttings from the drilled formation out of the well. Usually, the drilling mud is thixotropic, i.e., it increases in gel strength when quiescent and decreases in gel strength when agitated. With the drilling mud being thixotropic, the cuttings may be readily separated from the agitated drilling mud at the surface of the earth upon emergence from the well. Further, in the event circulation of the drilling mud is stopped for any reason, the cuttings will be suspended by the drilling mud within the well and not sink to the bottom thereof with resultant danger of the drill pipe becoming stuck. The thixotropic properties of a drilling mud are ordinarily imparted thereto by employing as one of the constituents thereof a swelling clay such as bentonite.

In order to prevent entry into the well of a fluid from a formation other than the desired producing formation after the well has been completed, the well is provided with a casing extending to the desired producing formation. The casing is cemented in place, and a sheath to isolate the desired producing formation from other formations is provided by pumping a cement slurry upwardly from the bottom of the casing through the annulus between the outer surface of the casing and the wall of the well. After the cement has set, the casing and the cement sheath in the annulus are perforated to the producing formation. Thus, fluid can pass from the desired producing formation into the casing, but fluid from other formations cannot pass into the casing.

In this cementing operation in a well, difficulty is often encountered as the result of drilling mud employed during the drilling operation remaining within the well. The mud will be present in the casing and in the annulus between the casing and the wall of the well. The annulus may be of relatively small volume where, during the drilling operation, no problem has been encountered in maintaining gauge, i.e., drilling the well at substantially the diameter of the drill bit. On the other hand, washouts may occur during the drilling operation whereby substantially large cavities or enlargements are formed along the wall of the well. Furthermore, the drilling mud, by virtue of being thixotropic and remaining quiescent in the well following completion of drilling, will attain considerable gel strength. Thus, the well may contain a relatively large volume of drilling mud having a high gel strength. This mud must be displaced from the localities where the cement is to be placed. Failure to displace the mud results in a poor bond between the cement and the outer surface of the casing and the wall of the well, permitting leakage of fluid to occur. Further, failure to displace the mud results in channeling of the cement through the gelled drilling mud with the result that islands of mud providing flow spaces for leakage of fluid remain in the cement after it has set. Accordingly, in cementing operations in a well, it is highly desirable to effect a substantially complete removal of the gelled drilling mud prior to placing the cement slurry in the well.

It is an object of this invention to provide a method for cementing a well in a subterranean formation.

It is another object of this invention to improve the bond between cement and the surface of casing and the wall of a well.

It is another object of this invention to avoid the effects due to channeling of cement in gelled drilling mud in a well.

It is another object of this invention to provide a method for displacing drilling mud from a well prior to cementing.

These and further objects of the invention will become apparent from the following detailed description.

In accordance with the invention, there is provided a method which involves as its essential step passing into a well, prior to placing a cement slurry therein, water containing a quantity sufficient to create a shear thickening viscoelastic liquid of polyvinyl alcohol and borate ions.

The advantages of a viscoelastic liquid for displacing a cake of gelled drilling mud ahead of cement in a well have been disclosed in my copending patent application with another, Serial No. 308,223, Cementing of Wells in an Earth Formation. As described therein, a viscoelastic liquid is a liquid which possesses both elastic and viscous properties. Viscoelastic liquids have a characteristic viscosity function, which function may or may not be dependent on rate of shear or stress. They also exhibit elasticity of shape and a retarded elastic recovery and deformation.

In laminar flow of a viscoelastic liquid, components of stress which are normal as well as tangential to the direction of the stress frequently develop and secondary flow effects appear. Thus, the normal stresses in a viscoelastic liquid flowing in a circular conduit cause an appreciable axial tension to develop. When the flowing liquid emerges from the circular conduit, the tension in the streamlines relaxes with the result that the liquid swells to a diameter in excess of the diameter of the conduit. As a result, the liquid leaving the conduit bulges outwardly forming what might be termed an enlarged bulb at the opening of the conduit.

Another characteristic of a viscoelastic liquid is its flow behavior between rotating concentric cylinders. Analysis of the complete spatial distribution of stress for a viscoelastic liquid in this situation shows that the primary phenomenon is the appearance of an additional tension along the streamlines. Between the rotating concentric cylinders, the streamlines are circles and the tension becomes a hoop or strangulation stress which constricts the liquid toward the axis of rotation. As a consequence, the liquid tends to climb the rotating cylinder and a pronounced thrust develops.

Further with respect to the characteristics of a viscoelastic liquid, it can be shown by theoretical analysis that flow in rectilinear paths through conduits of arbitrary cross section under a constant pressure gradient is not always possible for certain of these liquids. Thus, if the flow conduit is non-cylindrical, superimposed onto the simple rectilinear motion is a steady motion in which the liquid particles follow spiral paths to develop a vortexlike motion.

Each of the properties of a viscoelastic liquid described above is of value in displacing the gelled drilling mud in the well. With the development of axial tension of the viscoelastic liquid upon flow in a conduit, the resulting bulging effect enables the viscoelastic liquid to displace the gelled mud from cavities formed by a washout or otherwise within the well. The development of tension along the streamline of flow of the viscoelastic liquid and the development of thrust of the liquid will additionally effect displacement of the gelled drilling mud. In the latter case, it is assumed that the casing will tolerate some angular velocity of the viscoelastic liquid. Furthermore, the development of vortexlike motion in the flow of a viscoelastic liquid in a noncircular conduit, such as in an annulus where a washout or an irregularity has occurred, effects a thorough mixing and displacing action of the viscoelastic liquid with the gelled mud.

I have found that water containing polyvinyl alcohol and borate ions makes a particularly desirable viscoelastic liquid for use in the present method. Water containing polyvinyl alcohol and borate ions has the additional property of shear thickening. By shear thickening I mean that phenomenon wherein the material spontaneously changes from a readily pourable liquid to a cohesive, highly viscous mass when subjected to a critical level of shearing; but when shearing is subsequently reduced below this level, the mass reverts to its original liquid state. By virtue of its shear thickening properties, the water containing polyvinyl alcohol and borate ions has particular advantages. Thus, for example, in regions subjected to high rates of shear, such as those regions in which there is a tendency for channeling to occur such that the cement does not completely encircle and bond to both the casing and the wall of the well, the shear thickening viscoelastic solution of polyvinyl alcohol and borate ions spontaneously changes to a cohesive, highly viscous mass. This cohesive, highly viscous mass, as it moves through the channels, continuously enlarges the channels of flow and aids in the displacement of substantially all of the gelled drilling mud from between the casing and the wall of the well.

Further, in connection with the removal of the gelled drilling mud, the aqueous solution of polyvinyl alcohol and borate ions is also effective in removing the gelled drilling mud from regions where it is subjected to lower rates of shear. The mass rate of flow of the viscoelastic solution of polyvinyl alcohol and borate ions will be constant throughout the well. Thus, in flowing, for example, up the annular space between the wall of the casing and the wall of the well, this mass rate of flow will induce high rates of shear where the viscoelastic solution flows through relatively small annular openings, in contrast to lower rates of shear where the solution flows through relatively large annular openings such as in washed-out zones. In the relatively small annular openings, the shear thickening viscoelastic liquid thus spontaneously shear thickens into a viscous mass. There is a relatively slow reversion to the less viscous liquid after the shear thickened viscoelastic liquid has been flowed through a relatively small annular opening and has entered a relatively large annular opening. The duration of this reversion is referred to as an induction period. The complex rheological phenomenon associated with this induction period can be thought of as a sort of negative thixotropy. When a liquid exhibits the property of thixotropy, time causes an increase in the viscosity of the liquid after cessation of high shear rates. In the reversion occurring during the induction period, time causes a lowering of the viscosity of the shear thickened viscoelastic liquid after cessation of high shear rates. During such induction period, while still in the form of a cohesive, highly viscous viscoelastic mass, the liquid is particularly effective in removing drilling mud from the wall of the well, even in washed-out zones and other relatively large annular openings.

For better removal of gelled drilling mud, control of the viscosity of the shear thickening viscoelastic solution of polyvinyl alcohol and borate ions can be effected even after the solution has been injected into the well. This control is effected by controlling the flow rate at which the solution is injected into the well. For example, the solution may be injected at a low rate to prevent the attainment of high shear rates and thus high viscosity. Accordingly, the solution of polyvinyl alcohol and borate ions will achieve the usual beneficial displacement advantages of a viscoelastic liquid. Alternatively, the solution may be injected at higher flow rates to increase the regions in which high shear rates are achieved with consequent high viscosities.

As a consequence of the foregoing, by passing the shear thickening viscoelastic liquid into the well between the casing and the wall of the well prior to passing the cement into the well, an effective and substantially complete removal of the gelled drilling mud occurs. Consequently, an effective bonding of the cement between the casing and the wall of the well is effected whereby leakage of fluid between the cement and the casing, and between the cement and the wall of the well, is avoided. Additionally, with complete removal of the mud, channeling of the cement to form paths for flow of fluids through the cement is eliminated.

Viscoelastic properties can be inferred from any one of a variety of experimental techniques involving the previously described properties of viscoelastic liquids. These experimental techniques include (1) the jet expansion or jet thrust method, (2) the oscillatory Couette shear method, or (3) the torsional shear method. Such methods are well known to those skilled in the art and need not be described here. A liquid can exhibit the above-described properties of viscoelasticity without being shear thickening. However, any solution of polyvinyl alcohol and borate ions exhibiting the property of shear thickening will possess the above-described viscoelastic properties. Shear thickening, as mentioned previously, is demonstrated by an increase in the apparent viscosity of a solution when subjected to an increase in nominal shear rate within a certain range of nominal shear rates. Both the apparent viscosity and the nominal shear rate are readily determinable from a conventional rotational viscometer such as a Couette-type viscometer, e.g., a Brookfield viscometer with a U.L. adapter or a Fann viscometer. The property of shear thickening is apparent from the viscosity function data, as illustrated in Table I, to which table further reference will hereinafter be made. As the nominal shear rate increases, there will occur a region in which the apparent viscosity of the liquid will increase if the liquid possesses the property of shear thickening.

As used herein, polyvinyl alcohol is defined as the vinyl alcohol polymer which in a 4 percent by weight aqueous solution has a viscosity of from about 3 centipoises to about 65 centipoises at 20° C. The viscosity is measured on a Brookfield LVF viscometer, using a No. 1 spindle at 60 revolutions per minute. Such a vinyl alcohol polymer has a molecular weight of from about 10,000 to about 300,000. Hereinafter, wherever reference is made to a particular polyvinyl alcohol, it will be designated by a number which refers to the viscosity of a 4 percent solution of the polyvinyl alcohol at 20° C. For example, polyvinyl alcohol 5 designates a polyvinyl alcohol which in a 4 percent by weight aqueous solution has a viscosity of 5 centipoises at 20° C. Polyvinyl alcohol 5 has a molecular weight of approximately 50,000.

The polyvinyl alcohol alone will not form a shear thickening viscoelastic liquid with water, but requires the addition of borate ions. The borate ion is furnished, for example, by an ionizing borate such as an alkali metal borate. For practical purposes, sodium borate will be the ionizing borate used as the source of the borate ion. Sodium borate is used herein to define the compound having the formula $Na_2B_4O_7 \cdot 10H_2O$. When weight percentages of sodium borate are used, the molar equivalence of borate ions is determined with regard to this formula.

The solution of polyvinyl alcohol and borate ions contains at least about 1.3 percent by weight of polyvinyl alcohol. In order to produce shear thickening in this low concentration, the polyvinyl alcohol should be at least polyvinyl alcohol 30. The minimum concentration of polyvinyl alcohol necessary to produce useful shear thickening increases with lower-numbered polyvinyl alcohols, for example, to about 2.9 percent by weight with polyvinyl alcohol 5.

The solution of polyvinyl alcohol and borate ions should contain from at least 0.016 to 0.95 percent by weight of borate ions. The minimum amount of borate ions required is increased from 0.016 to a higher amount as the amount of a specific polyvinyl alcohol is decreased toward the minimum amount of polyvinyl alcohol required, as described and illustrated below. Amounts of borate ions greater than 0.95 percent by weight do not appear detrimental but are uneconomical. Further, these amounts of borate ions tend to precipitate a borate salt from the solution.

The particular amount of borate ions to be employed is related to the amount of and to the specific polyvinyl alcohol used. At the lower limit of concentration of a specific polyvinyl alcohol, greater amounts of borate ions are required than at higher concentrations of the specific polyvinyl alcohol. For example, at least 0.12 percent by weight of borate ions, as supplied by 0.29 percent by weight of sodium borate, is necessary to produce useful shear thickening in an aqueous solution containing 1.35 percent by weight of polyvinyl alcohol 65. However, only 0.056 percent by weight of borate ions, as supplied by 0.14 percent by weight of sodium borate, is required to produce useful shear thickening when 1.62 percent by weight of polyvinyl alcohol 65 is contained in the aqueous solution; and only 0.016 percent by weight of borate ions, as supplied by 0.04 percent by weight of sodium borate, is required when 2.15 percent by weight of polyvinyl alcohol 65 is contained in the aqueous solution. Further, when the solution contains 2.91 percent by weight of polyvinyl alcohol 5, 0.43 percent by weight of borate ions, as supplied by 1.06 percent by weight sodium borate, is required to produce a useful shear thickening liquid. With 4.2 percent by weight polyvinyl alcohol 5 contained in the solution, only 0.078 percent by weight borate ions, as supplied by 0.192 percent by weight sodium borate, induces useful shear thickening. As a further illustration, when the solution contains only 1.33 percent by weight of polyvinyl alcohol 30, 0.95 percent by weight borate ions, as supplied by 2.33 percent by weight of sodium borate, is required to produce useful shear thickening. However, when the solution contains 2.15 percent by weight of polyvinyl alcohol 30, only 0.028 percent by weight borate ions, as supplied by 0.07 percent by weight sodium borate, is required to produce useful shear thickening.

Typical data showing shear thickening is illustrated in Table I. The data for Table I was taken on a Fann model A37 rotational viscometer measuring the apparent viscosity at 25° C. of a solution containing 2.91 percent of polyvinyl alcohol 5 and 1.06 percent by weight of sodium borate at varying nominal rates of shear.

*Table I*

| Nominal Shear Rate (sec.$^{-1}$) | Shear Stress (Dynes/cm.$^2$) | Apparent Viscosity (Poise) |
|---|---|---|
| 6.31 | 10 | 1.58 |
| 20.2 | 20 | 0.98 |
| 41.0 | 32.5 | 0.79 |
| 66.6 | 60 | 0.90 |
| 86.8 | 90 | 1.03 |
| 96.6 | 125 | 1.29 |
| 109 | 175 | 1.60 |
| 118 | 235 | 1.98 |
| 131 | 325 | 2.47 |
| 137 | 385 | 2.80 |
| 155 | 625, 500 | 4.02, 3.21 |
| 175 | 915 | 5.21 |
| 189 | 1,100, 1,085, 1,025 | 5.81, 5.73, 5.41 |
| 213 | 1,125, 1,175 | 5.26, 5.50 |
| 234 | 1,400, 1,450, 1,500 | 5.96, 6.17, 6.39 |
| 234 | >1,500 | >6.4 |

In the practice of the invention, the shear thickening viscoelastic liquid is passed into the well as a body, or slug, of liquid. The amount of liquid in the body or slug to be employed will depend upon the volume of space between the casing and wall of the well from which the drilling mud is to be displaced. Where the thickness of the formation and thus the length of the casing to be cemented is small, the annular space between the liner and the wall of the well will also be small. In this situation, an amount of liquid of 1 to 2 barrels may be sufficient. On the other hand, an amount of liquid as much as 50 barrels may be required. Where the length of the wall of the well and the casing to be cemented is great or where the deviation of the wall of the well from the cylindrical configuration desired is large, greater quantities of the shear thickening viscoelastic liquid may be required.

It is preferred that the slurry of cement be pumped into the annulus between the casing and the wall of the well directly after displacement of the gelled drilling mud by the liquid having shear thickening viscoelastic properties. Whereas the gelled drilling mud has a high gel strength and thus is not readily displaced by the cement, the liquid having shear thickening viscoelastic properties selected for this purpose will not possess thixotropic properties and, hence, can be readily displaced by the cement. Furthermore, the shear thickening viscoelastic solution tends to move as a cohesive entity, displacing the drilling mud ahead of it and being in turn readily displaced by the cement. As a result, the cement is enabled to contact directly the wall of the well and the outer surface of the casing. Further, there is no viscoelastic solution remaining in the annular space to provide flow channels after setting of the cement.

Having thus described my invention, it will be understood that such description has been given by way of illustration and example and not by way of limitation, reference for the latter purpose being had to the appended claims.

What is claimed is:

1. In a method for cementing a well in the earth wherein cement is passed into said well, said well having been drilled employing a drilling mud containing a liquid phase and a solid constituent and a cake of gelled drilling mud remains in said well, the step comprising passing into said well prior to said cement a composition comprising (a) water, (b) polyvinyl alcohol having a molecular weight such that a 4 percent by weight aqueous solution has a viscosity at 20° C. of from 3 to 65 centipoises, and (c) borate ions, the particular amount of polyvinyl alcohol and the particular amount of borate ions being selected such that the composition possesses viscoelastic shear thickening properties, whereby said cake of said gelled drilling mud is displaced within said well.

2. In a method for cementing casing to a wall of a well in the earth wherein cement is passed into said well and upwardly through the annular space between said casing and said wall, said well having been drilled employing a drilling mud containing a liquid phase consisting of water and containing a solid constituent and a cake of gelled drilling mud remains between said casing and said wall of said well, the step comprising passing into said well in advance of said cement a solution comprising water containing polyvinyl alcohol and borate ions in amounts sufficient to induce shear thickening viscoelastic properties thereto whereby said cake of said gelled drilling mud is displaced from between said casing and said wall of said well.

3. The method of claim 2 wherein said polyvinyl alcohol has a molecular weight such that a 4 percent by weight aqueous solution has a viscosity at 20° C. of from 5 to 65 centipoises.

4. The method of claim 2 wherein an alkali metal borate is added to said solution as a source of said borate ions.

5. In a method for cementing a well in the earth wherein cement is passed into said well, said well having been drilled employing a drilling mud containing a liquid phase and a solid constituent and a cake of gelled drilling mud remains in said well, the step comprising passing into said well prior to said cement a composition comprising (a) water, (b) polyvnyl alcohol having a molecular weight such that a 4 percent by weight aqueous solution has a viscosity at 20° C. of from 3 to 65 centipoises, and (c) borate ions, the polyvinyl alcohol and the borate ions being in a minimum amount as follows:

polyvinyl alcohol—at least as great as 1.3 percent by weight of said composition, borate ions—at least as great as 0.016 percent by weight of said composition;

the particular amount of polyvinyl alcohol at least as great as 1.3 percent by weight of the composition and the particular amount of borate ions at least as great as 0.016 percent by weight of the composition being selected such that the composition possesses viscoelastic shear thickening properties, whereby said cake of said gelled drilling mud is displaced within said well.

6. In a method for cementing a well in the earth wherein cement is passed into said well, said well having been drilled employing a drilling mud containing a liquid phase and a solid constituent and a cake of gelled drilling mud remains in said well, the step comprising passing into said well prior to said cement a composition comprising (a) water, (b) polyvinyl alcohol having a molecular weight such that a 4 percent by weight aqueous solution has a viscosity at 20° C. of from 3 to 65 centipoises, and (c) borate ions, the polyvinyl alcohol and borate ions being in a minimum amount as follows:

| Polyvinyl Alcohol—Viscosity of a 4% by weight solution at 20° C. | Polyvinyl Alcohol—Wt. percent of the composition | Borate Ions—Wt. percent of the composition |
|---|---|---|
| 5 | 2.9 | 0.43 |
| 30 | 1.3 | 0.95 |
| 65 | 1.3 | 0.12 |
| 65 | 2.15 | 0.016 | the particular amount of said polyvinyl alcohol at least as great as said weight percent of the composition of said polyvinyl alcohol, and the particular amount of borate ions at least as great as 0.016 percent by weight of the composition when more than said weight percent of said polyvinyl alcohol is used, and at least as great as said weight percent of the composition of said borate ions when said weight percent of the composition of said polyvinyl alcohol is used, being selected such that the composition processes viscoelastic shear thickening properties, whereby said cake of said gelled drilling mud is displaced within said well.

7. In a method for cementing casing to a wall of a well penetrating subterranean formations wherein cement is passed into said well and upwardly through the annular space between said casing and said wall of said well, said well having been drilled employing a drilling mud containing a liquid phase consisting of water and containing a solid constituent and a cake of gelled drilling mud remains between said casing and said wall of said well, the step comprising passing into said well and upwardly through the annular space between said casing and said wall of said well in advance of said cement an aqueous composition containing at least 2.9 percent by weight of a polyvinyl alcohol which in a 4 percent by weight aqueous solution has a viscosity of approximately 5 centipoises at 20° C., and a sufficient quantity of sodium borate to induce the properties of shear thickening and viscoelasticity.

8. The method of claim 7 wherein said aqueous composition contains 2.91 percent by weight of said polyvinyl alcohol and 1.06 percent by weight of said sodium borate.

9. The method of claim 7 wherein said aqueous composition contains 4.2 percent by weight of said polyvinyl alcohol and 0.192 percent by weight of said sodium borate.

10. In a method for cementing a well in the earth wherein cement is passed into said well, said well having been drilled employing a drilling mud containing a liquid phase and a solid constituent and a cake of gelled drilling mud remains in said well, the step comprising passing into said well prior to said cement an aqueous composition containing at least 1.3 percent by weight of a polyvinyl alcohol which in a 4 percent by weight aqueous solution has a viscosity of at least 30 centipoises at 20° C., and sufficient quantity of sodium borate to induce the properties of shear thickening and viscoelasticity.

11. The method of claim 10 wherein said aqueous composition contains 1.33 percent by weight of said polyvinyl alcohol and 2.33 percent by weight of said sodium borate.

12. The method of claim 10 wherein said aqueous composition contains 2.15 percent by weight of said polyvinyl alcohol and 0.07 percent by weight of said sodium borate.

13. The method of claim 10 wherein said aqueous composition contains at least 1.35 percent by weight of a polyvinyl alcohol which in a 4 percent by weight aqueous solution has a viscosity of 65 centipoises at 20° C., and 0.29 percent by weight sodium borate.

14. The method of claim 10 wherein said solution contains 2.15 percent by weight of said polyvinyl alcohol and 0.04 percent by weight of said sodium borate.

15. The method of claim 10 wherein said solution contains 1.62 percent by weight of said polyvinyl alcohol and 0.14 percent by weight of said sodium borate.

References Cited by the Examiner
UNITED STATES PATENTS

| | | | |
|---|---|---|---|
| 2,135,589 | 11/1938 | Monson | 166—44 |
| 2,414,668 | 1/1947 | Ratcliff | 166—44 X |
| 2,693,856 | 11/1954 | Allen | 166—32 X |
| 2,827,964 | 3/1958 | Sandiford et al. | 166—42 X |
| 2,848,051 | 8/1958 | Williams | 166—28 |
| 3,079,337 | 2/1963 | Turbak et al. | 166—9 X |
| 3,082,823 | 3/1963 | Hower | 166—29 |
| 3,198,252 | 8/1965 | Walker et al. | 166—32 |

CHARLES E. O'CONNELL, *Primary Examiner.*

S. J. NOVOSAD, *Assistant Examiner.*